United States Patent [19]

Narisawa et al.

[11] Patent Number: 5,279,641
[45] Date of Patent: Jan. 18, 1994

[54] METHOD FOR CONCURRENT PRODUCTION OF COPPER POWDER AND A METAL CHLORIDE

[75] Inventors: Toshio Narisawa; Ryohei Kato, both of Aichi; Masanori Nakamura, Nara; Hitoyoshi Yamaguchi, Osaka, all of Japan

[73] Assignee: Nikko Fine Products Co., Ltd., Tokyo, Japan

[21] Appl. No.: 5,980

[22] Filed: Jan. 19, 1993

[30] Foreign Application Priority Data

Aug. 25, 1992 [JP] Japan .................. 4-247202

[51] Int. Cl.$^5$ .............................. B22F 9/24
[52] U.S. Cl. .......................... 75/353; 75/373; 423/493; 423/494
[58] Field of Search ............... 75/353, 361, 373, 730; 423/493, 494

[56] References Cited

U.S. PATENT DOCUMENTS 2,867,528  1/1959  Evans et al. .................. 75/373

FOREIGN PATENT DOCUMENTS 60-125304  7/1985  Japan .................. 75/353

Primary Examiner—George Wyszomierski
Attorney, Agent, or Firm—Wenderoth, Lind & Ponack

[57] ABSTRACT

A novel method is proposed for concurrently producing a metallic copper powder and a valuable chloride of a metal other than copper, e.g., manganese, zinc, cobalt, nickel and tin, from a depleted aqueous etching solution containing copper (II) chloride as discharged from the etching process in the manufacture of copper-foiled printed circuit boards. The inventive method also contributes to solve the problem for the disposal of such a waste solution without causing the troubles in connection with environmental pollution. The inventive method comprises the steps of: treating the waste solution with an active carbon so as to remove organic impurities; admixing the solution with a powder, granules or flakes of the above mentioned metal so as to precipitate the copper value in the metallic form, instead, giving an aqueous solution of the chloride of the added metal; and separating the copper metal powder and the chloride solution.

5 Claims, No Drawings

METHOD FOR CONCURRENT PRODUCTION OF COPPER POWDER AND A METAL CHLORIDE

BACKGROUND OF THE INVENTION

The present invention relates to a method for concurrently producing a copper powder and a chloride of a metal other than copper. More particularly, the invention relates to a method for concurrently producing a copper powder and a chloride of a metal other than copper such as manganese, zinc, cobalt, nickel and tin from an aqueous waste solution containing copper (II) chloride dissolved therein.

Along with the rapid progress of electronic industry in recent years, production of electronic instruments is expanding year by year while these electronic instruments are mostly assembled by arranging various kinds of electronic devices on a printed circuit board and building them into a circuit by connecting through the circuit pattern thus to construct an electronic working unit. Those printed circuit boards, hereinafter referred to as PCBs, are manufactured mostly by a process involving the step of pattern-wise etching of a copper foil adhesively bonded to the surface of an insulating substrate plate. The etching solution used for this purpose is an aqueous solution of copper (II) chloride acidified with hydrochloric acid while the depleted etching solution after use, having a specific gravity of about 1.25 and a pH value of 1 or below, usually contains, per liter of the solution, copper value in an amount of about 121 g as copper element and the overall chlorine value in an amount of about 241 g, of which about 106 g are as the chlorine ions of the hydrochloric acid, the remainder being as the counteranions of the copper (II) cations.

Such a strongly acidic waste solution containing a substantial amount of copper (II) chloride produced in a great volume in proportion to the production of PCBs of course cannot be discarded or disposed as a waste material not only from the standpoint of economy to justify recovery of at least the copper value but also from the standpoint of environmental pollution when a large volume of such a waste solution is released to public water systems. Accordingly, several methods have been proposed and practically undertaken for the recovery of copper value from such a waste solution including following three methods.

The first of the three methods is a substitution method in which the copper ions are replaced and fixed as a meal by the addition of a powder of iron as proposed in Japanese Patent Kokai 60-34501 and 63-33584 and a powder of aluminum as proposed in Japanese Patent Publication 63-14883. Namely, the copper ions are replaced with the ions of iron or aluminum and precipitated in the form of a powder which is recovered and purified to be utilized as metallic copper. The aqueous solution of iron chloride formed by the ion-substitution reaction above mentioned can be used partly as an etching solution or mostly as an inorganic flocculant in water treatment while the aqueous solution containing aluminum ions is utilized as a starting material for the manufacture of aluminum polychloride also useful as a flocculant.

The second of the three methods is a so-called neutralization method in which the waste solution is neutralized by the addition of sodium hydroxide so that the copper value is precipitated in the form of copper (II) hydroxide which is collected and subjected to a heating and dehydration treatment to be converted into copper (II) oxide. Alternatively, the copper (II) ions in the waste solution are first reduced with a copper powder into copper (I) ions followed by the neutralization with sodium hydroxide so as to be converted into copper (I) hydroxide which is collected and dehydrated into copper (I) oxide. Copper (II) oxide is utilizable as an ingredient in various kinds of ceramic materials including ferrites and the copper (I) oxide is used as a fouling-preventive pigment in ship-bottom paints.

The third of the three methods is an electrolytic method as proposed in Japanese Patent Kokai 60-128271, according to which, for example, the waste solution as such is electrolyzed by using an anion-exchange membrane to produce metallic copper and chlorine gas.

The above described three methods for the disposal of the waste solution containing a copper value each have a problem or limitation as an industrial method. For example, the substitution method has a problem in respect of the limited demand for the iron chloride or aluminum chloride produced as a by-product of the method. While these by-product chlorides have an application as a flocculant in water treatment or disposal of municipal sewage or industrial waste water, these inorganic flocculants in water treatment are under continuous replacement in recent years with flocculants based on an organic polymer so that no further increase can be expected in the demand for these inorganic flocculants, much less, to balance the rapidly increasing production of the waste solution in parallel with the increase in the production of PCBs. Accordingly, a serious problem of environmental pollution is foreseen if the only method relied on for the disposal of the waste solution is this substitution method. The neutralization method to produce oxides of copper is inherently not practicable in a large scale due to the problem in the disposal of the salt-containing waste solution produced in large volumes. Further, the electrolytic method is hardly feasible as an economical industrial process because of the quite large consumption of electric power.

SUMMARY OF THE INVENTION

The present invention accordingly has an object to provide a solution for the above described difficult problems in the disposal of the aqueous acidic waste solutions containing copper (II) chloride as produced in large volumes in the PCB-manufacturing process involving the etching step of copper foils by concurrently producing a copper powder and a useful chloride of a metal other than copper without the risk of causing environmental pollution.

Thus, the present invention provides a method for concurrently producing a copper powder and a chloride of a metal other than copper including manganese, zinc, cobalt, nickel and tin from an aqueous acidic solution containing a copper value in the form of copper (II) chloride dissolved therein and acidified with hydrochloric acid, which method comprises the steps of:

(a) admixing the aqueous solution with an active carbon to remove adsorbable impurities in the solution by the adsorption thereon followed by removal of the active carbon from the solution;

(b) admixing the solution at a temperature of 20° C. or higher with a powder of an additive metal selected from the group consisting of manganese, zinc, cobalt, nickel and tin in an amount of at least equivalent to the chlorine ions in the solution so as to cause replacement of the copper ions with ions of the additive metal with precipitation of the copper value in the elementary form; and (c) separating the precipitated copper value in the elementary form from the aqueous solution which is a solution of the chloride of the additive metal.

DETAILED DESCRIPTION OF THE PREFERRED EMBODIMENTS

As is described above, the inventive method comprises the above defined steps (a), (b) and (c) as the essential steps, of which the step (a) is a pre-treatment step of the aqueous solution as the starting material of the process. The origin of the acidic aqueous solution containing copper (II) chloride is not particularly limitative but the waste solutions produced in large volumes from the PCB-manufacturing process involving the etching step of copper foils can be used quite satisfactorily. The principal ingredients of such a waste solution are of course copper (II) chloride and hydrochloric acid usually accompanied by trace amounts of various kinds of metallic impurities in the form of soluble compounds. In addition, the waste solution is usually contaminated with small amounts of organic matters originating in the resinous compositions used as a resist material for the pattern-wise etching of the copper foil. These organic impurities are very detrimental against the efficiency of the step (b) so that they must be removed prior to the step (b) as completely as possible.

Step (a) of the inventive method is undertaken for this purpose, in which the waste solution is admixed with an appropriate amount of an active carbon so as to remove the organic impurities as adsorbed on the active carbon. The type of the active carbon is not particularly limitative but it is of course desirable that the active carbon has a capacity as large as possible for the adsorption of organic materials. Although any fine active carbon powders can be used in step (a), it is preferable to use a granular active carbon in consideration of the efficiency in the subsequent removal of the active carbon from the solution, for example, by filtration or centrifugation. The amount of the active carbon added to the aqueous solution is usually in the range from 0.2 to 1.0% by weight based on the aqueous solution but is variable depending on the amount of the organic impurities contained in the aqueous solution. Namely, the aqueous solution is admixed with the active carbon and agitated at room temperature for at least 30 minutes for the treatment so that the organic materials in the aqueous solution can be adsorbed on the active carbon almost completely. Extension of this treatment time to exceed 60 minutes has little additional advantages rather with a disadvantage of decreased productivity. After complete adsorption of the organic materials on the active carbon, the active carbon having the organic impurities thereon is removed from the aqueous solution by any conventional method including decantation, filtration and centrifugation to give a clear aqueous solution.

The clear aqueous solution obtained in step (a) above is then admixed with a powder of an additive metal selected from the group consisting of manganese, zinc, cobalt, nickel and tin. These additive metals each have a larger ionization tendency than copper so that, when the additive metal is contacted with the aqueous solution containing the copper ions, the additive metal is dissolved out in the form of cations as the counter ions for the chlorine anions Cl— and, instead, the copper value is precipitated in the elementary form. These additive metals are selected not only in respect of the higher ionization tendency than copper but also in respect of the industrial usefulness of the chlorides of the metals. These additive metals should have a purity as high as possible since impurities in the additive metal necessarily constitute the impurity in the aqueous solution of the chloride of the metal as one of the desired products in the inventive method. It is of course optional that two kinds or more of additive metals are used in combination when an aqueous solution containing two kinds or more of the metal chlorides in combination is desired.

The above described substitution reaction can be expressed by the reaction equation:

$$CuCl_2 + M \rightarrow MCl_2 + Cu, \quad (I)$$

in which M denotes the additive metal which is assumed to be divalent. Concurrently with the above described substitution reaction, another reaction takes place between the additive metal M and the free hydrochloric acid in the aqueous solution with evolution of hydrogen gas according to the reaction equation:

$$2HCl + M \rightarrow MCl_2 + H_2. \quad (II)$$

The above described two reactions define the amount of the additive metal to be added to the aqueous solution. Namely, the amount of the additive metal should be as exactly as possible equivalent to the total amount of the chlorine ions. When the amount of the additive metal is too small, a portion of the copper value would remain as unconverted into the elementary form to be an impurity in the chloride of the additive metal while, when the amount of the additive metal is too large, a portion of the additive metal remains as unutilized to be a metallic impurity in the recovered copper metal. The concentration of the chlorine ions in the aqueous solution can readily be determined, for example, by the methods of neutralization titration, Volhard titration and the like.

The above described reactions of step (b) are performed at a temperature of 20° C. or higher or, preferably, in the range from 40° to 100° C. Although the boiling point of the waste solution coming from the PCB-manufacturing process is usually about 104° C., no additional advantages can be obtained by increasing the temperature of the aqueous solution to exceed the boiling point under pressurization. When the reaction temperature is too low, the reaction proceeds at an unduly low velocity as a matter of course. It is preferable in order to ensure smooth and rapid proceeding of the reactions that the additive metal is in the form of a powder, granules, small shots or thin flakes having a relatively large surface area.

Although the substitution reaction expressed by the above given reaction equation (I) proceeds at a high velocity, proceeding of the reaction may be inhibited when the surface of the additive metal is covered by the precipitates of the copper metal. In this regard, it is important that the reaction mixture is agitated in such an intensity that the precipitates of the metallic copper deposited on the surface of the additive metal can be rapidly removed off from the surface of the additive metal. When the additive metal is manganese or zinc, in particular, the reaction of the additive metal with the free hydrochloric acid according to the reaction equation (II) given above is sometimes so violent as to cause splashing of the solution by the evolved hydrogen gas so that it is preferable that the additive metal is introduced into the aqueous solution at a low rate or in small portions under monitoring of the condition of the solution.

When step (b) of the inventive method is performed in the above described manner, the copper ions contained in the starting aqueous solution are reduced into the elementary form and precipitated as finely divided particles while the additive metal is dissolved out into the solution to form a chloride of the metal. The copper particles are recovered by separating from the aqueous solution in a known solid-liquid separating method such as filtration and centrifugation followed by washing with water and drying, preferably, in a non-oxidizing atmosphere. The aqueous solution freed from the copper precipitates contains the chloride of the additive metal as the solute in a quite high concentration and in a high purity so that the solution can be used as such for an intended application although it is optional that the aqueous solution is concentrated to have an increased concentration as desired by evaporating a part of water as the solvent or the metal chloride is crystallized into hydrated or unhydrated crystals by a known procedure.

The thus prepared chlorides of the additive metals are each a useful compound having wide applications in industry. For example, zinc chloride is used as a constituent of dry batteries, for the activation of active carbons and as an electrolyte in a plating bath for zinc plating. Cobalt chloride is useful as an electrolyte in a plating bath, ingredient in drying agent, catalysts and ingredient in inks. Tin (II) chloride has applications in discharge printing and plating and is useful as an ingredient in dyeing pigments and catalysts. Nickel chloride is useful as an ingredient in an electrolytic or electroless plating bath and as an active ingredient in verious kinds of catalysts. Manganese chloride is used in dyeing and as an ingredient in drying agents, dry batteries and catalysts.

In the following, the method of the present invention is described in more detail by way of examples, which, however, never limit the scope of the invention in any way.

EXAMPLE 1

The starting aqueous solution processed as described below was a depleted etching solution coming from the manufacturing process of PCBs having a specific gravity of 1.253 at 27° C. and contained, each per liter, 121 g of copper, 241 g of chlorine as a total, of which 106 g were as free hydrochloric acid, 9.8 mg of zinc, 5.9 mg of sodium, 2.2 mg of chromium, 1.5 mg of calcium, 1.2 mg of magnesium, 0.34 mg of nickel, 0.33 mg of iron, 0.1 mg of lead and a trace amount of manganese.

In the first place, 100 g of a powder of active carbon were added to 20 liters of the above described aqueous solution, which was agitated for 1 hour at room temperature followed by filtration under suction to remove the active carbon from the solution giving a filtrate which was a clear and deep green solution.

Into a three-necked flask of 2 liters capacity equipped with a stirrer and a reflux condenser were introduced 1 liter of the above obtained aqueous solution after the active carbon treatment followed by gradual addition of 300 g of metallic tin granules. The mixture in the flask was heated at 90° C. or higher under agitation for 10 hours so that the aqueous solution turned colorless with precipitates of metallic copper suspended therein. The precipitates were collected by filtration under suction to give 970 ml of a filtrate which was found by analysis to contain tin (II) chloride in an amount of 287.1 g calculated as metallic tin corresponding to 297 g of tin per liter. The recovery of tin was 95.7%. The cake of metallic copper on the filter was washed with water and dried in a non-oxidizing atmosphere to give 120 g of a copper powder.

Table 1 below shows the results of the chemical analysis undertaken with the tin chloride solution to give the contents of tin and the respective metallic impurity elements contained in liter of the solution. It is understood from Table 1 that the here obtained aqueous solution of tin chloride has a quite high purity so that it can be used as such in most practical applications.

EXAMPLE 2

The experimental procedure was substantially the same as in Example 1 excepting replacement of 300 g of the metallic tin granules used in Example 1 with 190 g of high-purity electrolytic manganese in a flaky form. The manganese flakes were introduced into the flask containing the aqueous solution of copper chloride in 20 g portions at 5 minutes intervals and the aqueous solution after addition of the whole amount of the manganese flakes was agitated at 80° C. for 1 hour. About 120 g of copper metal could be recovered by filtration to give 970 ml of the filtrate solution which contained manganese chloride in a concentration of 185 g/liter calculated as manganese metal. The contents of the metallic constituents in liter of this filtrate solution are shown in Table 1.

EXAMPLE 3

The experimental procedure was substantially the same as in Example 2 excepting replacement of 190 g of the metallic manganese flakes with 225 g of granules of zinc metal. The granules of zinc metal were introduced into the flask containing the aqueous solution of copper chloride in 22.5 g portions at 5 minutes intervals and the aqueous solution after addition of the whole amount of the zinc granules was agitated at 80° C. for 1 hour. About 120 g of copper metal could be recovered by filtration to give 970 ml of the filtrate solution. The contents of the metallic constituents in liter of this filtrate solution are shown in Table 1.

EXAMPLES 4 AND 5

The experimental procedure in each of Examples 4 and 5 was substantially the same as in Example 2 excepting replacement of the metallic manganese flakes with 205 g of a powder of metallic cobalt and 202 g of a powder of metallic nickel, respectively. The additive metal was introduced into the aqueous solution of copper chloride in three equal portions at 30 minutes intervals and the aqueous solution containing the additive metal was agitated for 6 hours at 90° C. or higher. About 120 g of copper metal could be recovered by filtration to give 970 ml of the filtrate solution in each example. The contents of the metallic constituents in liter of each filtrate solution are shown in Table 1.

TABLE 1

| Example No. | 1 | 2 | 3 | 4 | 5 |
|---|---|---|---|---|---|
| Cu | 1.2 mg | 3.0 mg | 2.7 mg | 3.9 mg | 4.5 mg |
| Fe | 8.5 mg | 1.3 mg | 0.5 mg | 5.0 mg | 5.1 mg |
| Mn | trace | 185 g | trace | trace | trace |

TABLE 1-continued

| Example No. | 1 | 2 | 3 | 4 | 5 |
|---|---|---|---|---|---|
| Zn | 11 mg | 9.6 mg | 219 g | 14 mg | 11 mg |
| Pb | 14 mg | 1.1 mg | 1.3 mg | 1.2 mg | 1.2 mg |
| Ni | 0.5 mg | 1.3 mg | 0.4 mg | 155 mg | 197 g |
| Cr | 2.3 mg | 2.5 mg | 2.4 mg | 2.2 mg | 2.3 mg |
| Ca | 4.1 mg | 2.0 mg | 1.9 mg | 7.1 mg | 6.5 mg |
| Mg | 3.5 mg | 1.3 mg | 1.3 mg | 1.2 mg | 1.2 mg |
| Na | 5.9 mg | 6.0 mg | 5.8 mg | 5.9 mg | 6.1 mg |
| Co | N.D. | N.D. | N.D. | 198 g | 45 mg |
| Sn | 297 g | N.D. | N.D. | N.D. | N.D. |

(N.D.: not detected)

What is claimed is:

1. A method for concurrently producing a copper powder and a chloride of a metal selected from the group consisting of manganese, zinc, cobalt, nickel and tin from an aqueous acidic solution containing a copper value in the form of copper (II) chloride dissolved therein and acidified with hydrochloric acid, which method comprises the steps of:
   (a) admixing the aqueous solution with an active carbon to remove adsorbable impurities in the aqueous solution by the adsorption thereon followed by removal of the active carbon from the solution;
   (b) admixing the solution at a temperature of 20° C. or higher with a powder of an additive metal selected from the group consisting of manganese, zinc, cobalt, nickel and tin in an amount of at least annular equivalent of the chlorine ions in the solution so as to cause replacement of the copper ions in the solution with ions of the additive metal with precipitation of the copper value in elemental form and so as to cause the aqueous solution to become a solution of the chloride of the additive metal; and
   (c) separating the precipitated copper value in elemental form from the aqueous solution.

2. The method for concurrently producing a copper powder and a chlbride of a metal other than copper as claimed in claim 1 in which the amount of the active carbon added to the solution in step (a) is in the range from 0.2 to 1.0% by weight based on the aqueous solution.

3. The method for concurrently producing a copper powder and a chloride of a metal other than copper as claimed in claim 1 in which the aqueous solution admixed with the active carbon in step (a) is agitated for at least 30 minutes.

4. The method for concurrently producing a copper powder and a chloride of a metal other than copper as claimed in claim 1 in which the amount of the additive metal added to the aqueous solution in step (b) is substantially a molar equivalent of the total amount of the chlorine ions in the aqueous solution.

5. The method for concurrently producing a copper powder and a chloride of a metal other than copper as claimed in claim 1 in which the aqueous solution admixed with the additive metal in step (b) is agitated at a temperature in the range from 40° to 100° C.

* * * * *

UNITED STATES PATENT AND TRADEMARK OFFICE
CERTIFICATE OF CORRECTION

PATENT NO. : 5,279,641
DATED : January 18, 1994
INVENTOR(S) : Toshio Narisawa et al It is certified that error appears in the above-indentified patent and that said Letters Patent is hereby corrected as shown below:

Column 1, line 49, change "meal" to --metal--.

Column 3, line 67, change "Cl-" to --Cl$^-$--.

Column 7, line 30, change "annular" to --a molar--.

Signed and Sealed this

Twenty-seventh Day of December, 1994

Attest:

BRUCE LEHMAN

Attesting Officer    Commissioner of Patents and Trademarks